Patented Feb. 6, 1940

2,189,522

UNITED STATES PATENT OFFICE 2,189,522

PRODUCTION OF POLYAZO DYESTUFFS AND NEW INDUSTRIAL PRODUCTS RESULTING THEREFROM

Georges Kopp and René Gangneux, Rouen, France, assignors to Compagnie Nationale de Matieres Colorantes et Manufactures de Produits Chimiques du Nord Reunies, Etablissements Kuhlmann, Paris, France, a corporation of France No Drawing. Application July 27, 1938, Serial No. 221,604. In France March 9, 1938

2 Claims. (Cl. 260—159)

This invention relates to a process for the production of polyazo dyestuffs, new industrial products resulting therefrom and their industrial applications.

It has been found according to the present invention that valuable polyazo dyestuffs are obtained when there are coupled asymmetrically the tetrazo compounds derived from the bases of the general formula:

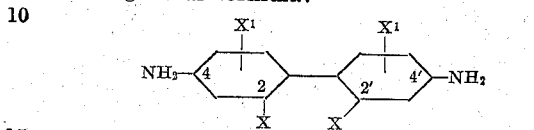

(in which X represents an alkyl or alkoxy group or a halogen atom and $X^1$ represents an alkyl or alkoxy group or a halogen or hydrogen atom), on one hand with any coupling component and on the other hand with an azo dyestuff obtained by acid coupling of an aminonaphthol mono or disulphonic acid with any diazo compound.

As coupling component it is possible to employ for example a phenol, an amine of the benzene series, an aminophenol, a naphthol, a naphthylamine, an aminonaphthol, a pyrazolone or a β-diketone; each of these coupling components can be substituted in any manner for example by alkyl, alkoxy, aryloxy, halogen, nitro, sulpho or carboxy groups, or by the groups

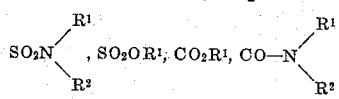

(in which $R^1$ is an alkyl or isocyclic radicle which may be substituted and $R^2$ a hydrogen atom or a radicle as represented by $R^1$).

These same substituents can also be contained by the diazo component mentioned above.

The polyazo dyestuffs obtained have the general formula:

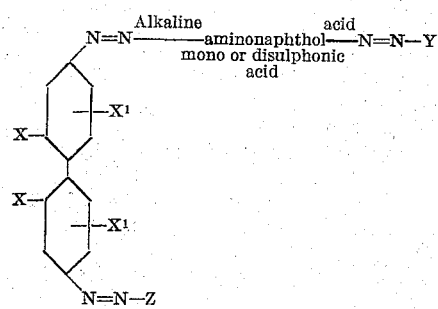

in which X represents an alkyl or alkoxy group or a halogen atom, $X^1$ an alkyl or alkoxy group or a halogen or hydrogen atom, Y any diazo component and Z any coupling component.

For each dyestuff the preparation is carried out in the most favourable direction as regards the order of coupling.

These new dyestuffs dye animal fibres in violet, black, blue and green shades of good brightness and very good yield. They possess, in particular, a remarkable affinity for natural silk in a neutral bath.

The dyeings obtained with these dyestuffs possess interesting fastness properties, particularly to light, to strong washing, to alkaline fulling and to perspiration. These dyeings can in general be discharged giving white discharges fast to light.

The majority of the dyestuffs can by reason of their good solubility be employed in dyeing on the machine.

Finally, a large number of these dyestuffs, for example in the form of their free sulphonic acids, or isolated in a strongly acid medium or in the form of their salts with organic bases, can be utilised for the colouring of solvents, mixtures of solvents and varnishes.

They exhibit very definite advantages with respect to the similar dyestuffs derived from bases of the general formula:

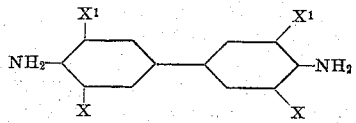

in which X and $X^1$ have the above significance but are located in position ortho to the diazo group; these dyestuffs in fact, even if they dye cellulose, have only an insufficient affinity for animal fibres and they cannot be utilised in practice for the colouring of solvents and varnishes, because in general their solubility is poor.

Finally the dyestuffs according to the invention complete in an advantageous manner the range of azo dyestuffs particularly as regards green dyestuffs, as the said range has hitherto only comprised a few members of this shade.

The following examples illustrate the present invention without limiting the same thereto.

Example 1

212 parts of 2.2'-dimethyl-4.4'-diamino-diphenyl are tetrazotised by means of 500 parts of hydrochloric acid of 19° Bé., 140 parts of sodium nitrite in solution and 3500 parts of ice-water.

Into the tetrazo compound thus obtained is allowed to flow all at once the solution of 138 parts of salicylic acid, 120 parts of caustic soda of 35° Bé. and 420 parts of sodium carbonate in 4000 parts of water. The temperature is maintained in the neighbourhood of 0° C. during two hours. At the end of this time, coupling being complete there is rapidly poured in a solution of the monoazo dyestuff prepared as follows:

138 parts of o-nitraniline are pasted for three hours in 500 parts of hydrochloric acid of 19° Bé. and 250 parts of water, the whole is cooled at 0° C. and diazotised by means of 70 parts of sodium nitrite in solution. The diazo solution after filtration is caused to flow rapidly into a slightly acid and ice-cooled emulsion of 341 parts of 1-amino-8-hydroxy-naphthalene-3.6-disulphonic acid (monosodium salt) and 5000 parts of water. Coupling being complete at the end of three hours, 600 parts of caustic soda of 35° Bé. are caused to flow in in such a manner as to neutralise the acidity and a further 120 parts of sodium carbonate are added. The monoazo dyestuff passes completely into solution.

After having poured this solution into the diazoazo solution prepared above, the whole is stirred for about twelve hours, heated to 70° C. and the dyestuff isolated in the customary manner.

It dyes natural silk a greenish blue of good fastness.

Example 2

In the preparation of the dyestuff employed in Example 1 as second coupling component the o-nitraniline is replaced by p-nitraniline. The monoazo dyestuff produced under the same conditions and dissolved in 600 parts of caustic soda and 420 parts of sodium carbonate is added all at once to a tetrazo compound derived from 2.2'-dimethyl-4.4'-diaminodiphenyl prepared as in Example 1.

The coupling which takes place on one side only is complete in a few minutes. The diazo disazo compound formed is subjected to the addition of a solution of 177 parts of acetoacetanilide and 120 parts of caustic soda of 35° Bé. in 2500 parts of water.

The dyestuff, isolated in the customary manner, dyes wool a very bright green-blue of good fastness properties.

Example 3

In the preparation of the dyestuff obtained in Example 2, the solution of acetoacetanilide is replaced by a solution of 3.5 parts of 2-phenylamino-8-hydroxynaphthalene-6-sulphonic acid and 120 parts of caustic soda of 35° Bé. in 4000 parts of water.

The dyestuff obtained exhibits a remarkable affinity for natural silk which it dyes a clear black. When coated on in clear shades, it permits of obtaining grey blues of good fastness.

Example 4

In the preparation of the dyestuff obtained in Example 2 the solution of acetoacetanilide is replaced by a solution of 215 parts of the ethyl ester of 2-naphthol-3-carboxylic acid in 5000 parts of alcohol.

The dyestuff isolated in the customary manner dyes natural silk a reddish blue of good fastness properties.

Example 5

A tetrazo solution identical with that of Example 1 is produced and there is allowed to flow into this solution the slightly acid solution of 288.5 parts of 1-(2'-chloro-5'-sulpho-phenyl)-3-methyl-5-pyrazolone and 100 parts of caustic soda of 35° Bé. in 2000 parts of water. At the end of three hours the coupling is practically complete; in order to complete it, within one hour 450 parts of sodium acetate in solution are allowed to flow into a slight mineral acid reaction.

To this diazoazo compound is added rapidly an alkaline solution of 502.5 parts of the monoazo dyestuff obtained by coupling of 1-diazo-2-chloro-3-nitrobenzene with an acid emulsion of 1-naphthol-8-aminonaphthalene-3.6-disulphonic acid.

The dyestuff obtained dyes natural silk greenish yellow of good brightness and good levelling capacity.

Example 6

Within a few minutes a tetrazo solution identical with that obtained according to Example 1 is caused to flow into a monoazo dyestuff prepared in the following manner:

During three hours 162 parts of 2.5-dichloraniline and 500 parts of hydrochloric acid of 19° Bé. are pasted in 250 parts of water. After cooling to 0° C. the whole is diazotised by means of 70 parts of sodium nitrite in solution. The diazo compound obtained is after filtration caused to flow into a paste distinctly acid to Congo red and cooled in ice of 341 parts of the monosodium salt of 1-amino-8-hydroxy-naphthalene-3.6-disulphonic acid in 10,000 parts of water. When the coupling is complete 600 parts of caustic soda in solution of 35° Bé. and 420 parts of sodium carbonate are added.

When the diazo disazo compound has formed a solution of 94 parts of phenol and 120 parts of caustic soda of 35° Bé. in 500 parts of water is allowed to flow in. There is obtained a dyestuff which dyes natural silk a very bright bluish green.

Example 7

By replacing in the preceding example the phenol by 174 parts of 1-phenyl-3-methyl-5-pyrazolone there is obtained a dyestuff dyeing leather a greenish blue of good brightness and very good fastness. This dyestuff converted into free sulphonic acid and employed for the colouring of cellulosic varnishes gives coatings of a greenish black shade of very good fastness to light and very good covering power.

Example 8

253 parts of 2.2'-dichloro-4.4'-diamino-diphenyl are tetrazotised by means of 500 parts of hydrochloric acid of 19° Bé., 3500 parts of water and 140 parts of sodium nitrite in solution. Into the tetrazo compound thus obtained there is allowed to flow all at once the monoazo dyestuff obtained in the following manner:

172.5 parts of o-chloro-p-nitraniline are diazotised by means of 500 parts of hydrochloric acid of 19° Bé., 250 parts of water and 70 parts of sodium nitrite in solution. After filtration the diazo compound thus obtained is caused to flow rapidly into an acid pasting of 239 parts of 1-amino-8-hydroxynaphthalene-4-sulphonic acid and 5000 parts of water. When the coupling is complete 600 parts of caustic soda of 35° Bé. are caused to flow in and 420 parts of sodium carbonate are added.

The diazo disazo compound obtained is subjected to the rapid addition of a solution of 144 parts of β-naphthol and 120 parts of caustic soda of 35° Bé. in 2500 parts of water.

The dyestuff obtained dyes natural silk a reddish black of good fastness properties.

*Example 9*

Into the tetrazo solution prepared according to Example 8 there is caused to flow all at once the solution of the dyestuff "p-nitraniline-1-amino-8-hydroxynaphthalene - 3.6 - disulphonic acid" (monosodium salt) prepared according to Example 2.

The diazo disazo compound thus obtained is subjected to the addition of a solution of 341 parts of 1-amino-8-hydroxynaphthalene-3.6-disulphonic acid (monosodium salt) and 120 parts of caustic soda of 35° Bé. in 2500 parts of water.

There is obtained a dyestuff which in the pure state dyes leather a greenish blue of good fastness properties.

*Example 10*

In the preparation of the dyestuff according to Example 2 the solution of acetoacetanilide is replaced by a solution of 94 parts of phenol and 120 parts of caustic soda of 35° Bé. in 500 parts of water.

There is obtained a dyestuff which dyes animal fibres a greenish blue of good fastness properties.

This dyestuff converted into the free acid by treatment of the solution of its sodium salt with a dilute mineral acid, can be used advantageously for the colouration of solvents, mixtures of solvents and cellulosic varnishes.

*Example 11*

A tetrazo solution is prepared identical with that of Example 1 and this tetrazo derivative is caused to flow rapidly into a solution of monoazo dyestuff prepared as follows:

During three hours 138 parts of o-nitraniline are pasted in 500 parts of hydrochloric acid of 19° Bé. and 250 parts of water, the whole cooled in ice and diazotised by means of 70 parts of sodium nitrite in solution. The diazo compound after filtration is caused to flow rapidly into a slightly acid and ice-cooled emulsion of 341 parts of the monosodium salt of 1.8-aminonaphthol-3.6-disulphonic acid and 5000 parts of water. The coupling is complete by the end of three hours and 600 parts of caustic soda of 35° Bé. are added to neutralise the acidity, after which there are further added 420 parts of sodium carbonate.

The coupling is complete in a few minutes. Then an ice-cooled solution of 174 parts of 1-phenyl-3-methyl-pyrazolone and 120 parts of caustic soda of 35° Bé. in 500 parts of water is rapidly allowed to flow in.

The dyestuff obtained, isolated in the customary manner, dyes animal fibres in green shades or good brightness and good fastness to light. The dyestuff converted into the free acid or converted into a salt with ditolyl guanidine can be utilised for the colouring of solvents, cellulosic varnishes and so on.

*Example 12*

By replacing in the above example the o-nitraniline by p-nitraniline and the phenylmethylpyrazolone by 94 parts of phenol there is obtained a green-blue of very good yield and good fastness properties.

What we claim is:

1. Polyazodyestuffs of the general formula:

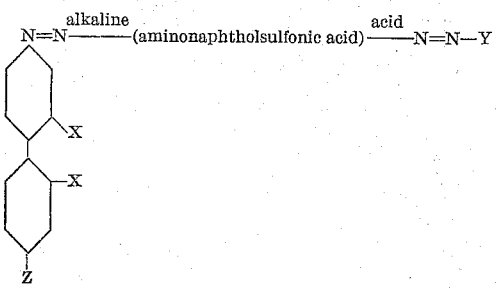

in which X represents a member of the group consisting of alkyl groups and halogen atoms, Y stands for a radical of an amine of the benzene series, and Z is a member of the group consisting of phenols, amines of the benzene series, aminophenols, naphthols, naphthylamines, aminonaphthols, pyrazolones and beta-diketones.

2. Process for the manufacture of polyazo dyestuffs consisting in coupling the tetrazo compounds of bases of the general formula:

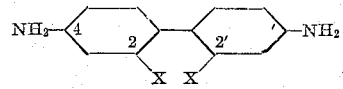

in which X represents a member of the group consisting of alkyl groups and halogen atoms, first with a member of the group consisting of phenols, amines of the benzene series, aminophenols, naphthols, naphthylamines, aminonaphthols, pyrazolones and beta-diketones, and second, with an azodyestuff resulting from the acid coupling of an aminonaphthol sulphonic acid with the diazo compound of an aromatic amine of the benzene series.

GEORGES KOPP.
RENÉ GANGNEUX.